No. 771,616. PATENTED OCT. 4, 1904.
S. E. DOANE.
SPARKING DEVICE FOR EXPLOSIVE ENGINES.
APPLICATION FILED NOV. 13, 1903.
NO MODEL.

Witnesses.
E. B. Gilchrist
B. W. Brockett

Inventor.
Samuel E. Doane,
By his Attorneys,
Thurston & Bates

No. 771,616. Patented October 4, 1904.

UNITED STATES PATENT OFFICE.

SAMUEL EVERETT DOANE, OF CLEVELAND, OHIO.

SPARKING DEVICE FOR EXPLOSIVE-ENGINES.

SPECIFICATION forming part of Letters Patent No. 771,616, dated October 4, 1904.

Application filed November 13, 1903. Serial No. 181,022. (No model.)

*To all whom it may concern:*

Be it known that I, SAMUEL EVERETT DOANE, a citizen of the United States, residing at Cleveland, in the county of Cuyahoga and State of Ohio, have invented a certain new and useful Improvement in Sparking Devices for Explosive-Engines, of which the following is a full, clear, and exact description, reference being had to the accompanying drawings.

The object of this invention is to provide a simple, durable, and efficient mechanism for making and breaking the contact which induces the spark in an explosive-engine, the device being particularly adaptable for use in automobiles.

Heretofore automobiles employing explosive-engines have frequently been arranged with a rotatable cam device and a spring contacting with the periphery thereof to make and break the circuit. This arrangement has caused difficulty by the parts becoming worn or the spring breaking or bending. The present invention is designed to do away with these difficulties. This is accomplished by placing the contact projection on the side of the cam-collar instead of its periphery and causing the same to engage with a projection on a sleeve slidably mounted on the cam-shaft, the sleeve being spring-pressed toward the cam. This makes a very simple and efficient mechanism and one which is very durable and is not materially affected by wear and does not get out of order.

The invention consists in such arrangement of parts and more particularly as hereinafter described and claimed.

Figure 1:
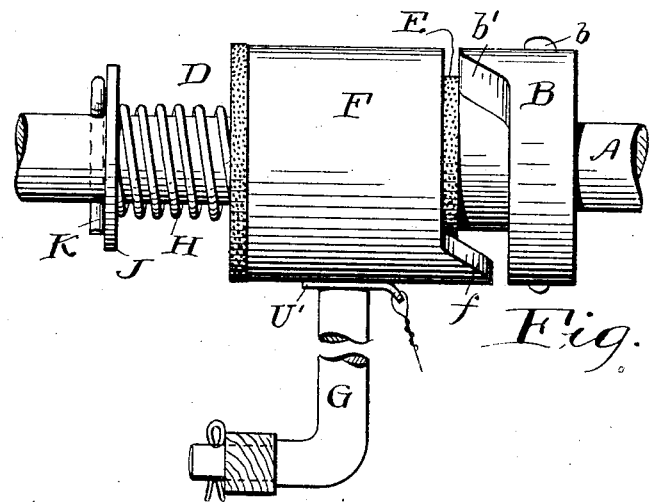
Figure 2:
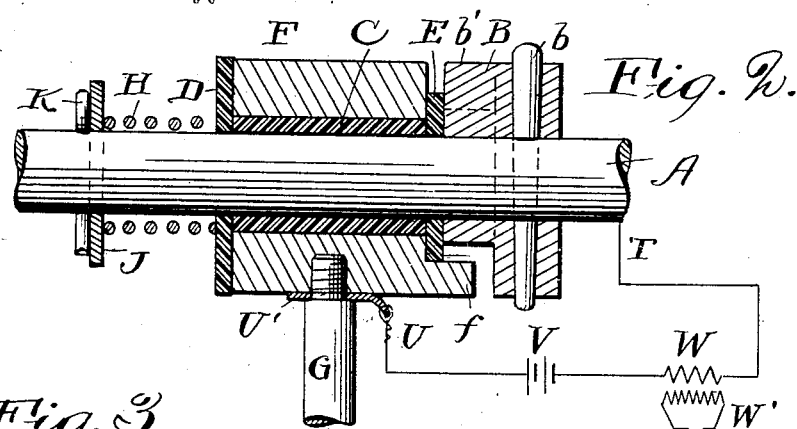
Figure 3:
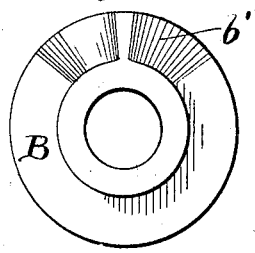
Figure 4:
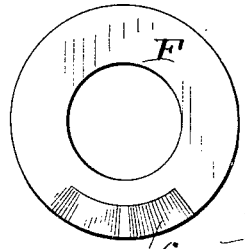

The drawings clearly disclose my invention, Figure 1 being a side elevation of the contact maker and breaker mounted on a suitable rotating shaft. Fig. 2 is a central longitudinal section of the same; and Figs. 3 and 4 are views of the coöperating faces of the cam-collar and sleeve, respectively.

Referring to the parts by letters, A represents a suitable rotating shaft. Rigidly secured to this shaft is a collar B, a pin b, passing through the collar and shaft, being shown as the method of securing the same. A cam-face b' is formed on the side of this collar instead of on its periphery. Loosely surrounding the shaft is an insulating-bushing C, preferably made of fiber. At the ends of this bushing are washers D and E surrounding the shaft. Around the bushing C and between the washers D and E is the sleeve F. Secured to this sleeve is the operating-arm G, which holds the sleeve in any position desired radially of the shaft, but allows the sleeve to slide longitudinally on the shaft.

On the front end of the sleeve F is a projection f, which is adapted to be engaged by the cam-face b' on the collar B. A helical spring H surrounds the shaft A between the washer D and another washer J, held in place by the cotter-pin K. This spring presses the fiber-washers and bushing and the sleeve F toward the collar.

One terminal of the electric circuit, as T, is electrically connected with the shaft A. The other terminal, as U, is connected by a suitable washer U', surrounding the end of the arm G with the sleeve F. Intermediately the circuit is arranged in any manner desired, that shown being through the battery V and through the primary W of an inductive coil, the secondary W' of this coil being connected with the separated electrodes Y in the explosion-chamber Z of the explosion-engine. As the shaft is rotated the circuit through the primary is open until the cam-face b' contacts with the projection f. This closes the circuit. At the same time the sleeve F, together with the fiber insulation, is forced away from the cam against the action of the spring H. The circuit remains closed at this point as long as the projection f and the cam b' are in contact; but as soon as the cam clears the projection f the circuit is opened at this point and with the circuit arranged as illustrated in the drawings a current is induced from the secondary which results in a spark at the electrodes Y.

In this invention it will be seen that the member which contacts with the cam is a longitudinally-slidable sleeve having a large contact-surface and large bearing-surface on the shaft. Thus the wear is reduced to an immaterial amount. The strain on the helical spring H is so small that it will last indefinitely. The arrangement does not interfere with the sleeve F being turned radially by the arm G to various positions to govern the time of sparking as desired.

Having described my invention, I claim—

1. In a sparking device for an explosive-engine, a collar and a longitudinal shiftable sleeve, said collar and sleeve having coöperating projections forming the terminals of an electric circuit, and a shaft for said sleeve, substantially as described.

2. In a sparking device for an explosive-engine, a cam, a shaft for rotating the same, a sleeve on the shaft shiftable by means of the cam, said cam and sleeve causing the circuit to be made and broken, substantially as described.

3. In a sparking device for explosive-engines, the combination of a rotatable shaft, a collar thereon having a cam on its side, a sleeve surrounding the shaft adapted to be shifted longitudinally by the cam, and a spring pressing the sleeve toward the cam, the cam and sleeve governing an electric circuit, substantially as described.

4. In a sparking device for explosive-engines, the combination of a rotatable shaft, a cam thereon forming one terminal of an electric circuit, a sleeve surrounding the shaft and insulated from it and slidably upon it and forming the other terminal of said circuit, said sleeve being adapted to move longitudinally by said cam, and a spring pressing the sleeve toward the cam, substantially as described.

5. The combination of a shaft, a cam carried thereby, an insulating-sleeve surrounding the shaft, a metallic sleeve surrounding the insulating-sleeve, and having a projection adapted to be engaged by said cam, said metallic sleeve and cam forming terminals of an electric circuit, and a spring pressing the sleeve toward the cam, substantially as described.

6. The combination of a shaft, a collar rigidly secured thereto and having a cam-face on its side, an insulating-sleeve surrounding the shaft, a metallic sleeve surrounding the insulating-sleeve and having a projection toward the same cam-face, an insulating-washer surrounding the shaft between the sleeve and cam, a helical spring surrounding the shaft on the other side of the metallic sleeve and operating to press the same toward the cam, substantially as described.

7. The combination of a shaft, a cam rigidly secured thereto, an insulating-sleeve loosely surrounding the shaft, washers surrounding the shaft at opposite ends of said sleeve, a metallic sleeve surrounding said insulating-sleeve between the washers and having a projection extending beyond one of the washers toward the cam, an operating-arm secured to said metallic sleeve, a helical spring surrounding the shaft, a suitable abutment secured to the shaft and compressing said spring between it and the insulating-washer which is on that side of the metallic sleeve opposite the cam, and an electric circuit of which the cam is one terminal and the metallic sleeve the other, substantially as described.

8. In a sparking device for an explosive-engine a rotatable cam, a longitudinally-shiftable sleeve having a coöperating projection, said cam and said projection forming the terminals of an electric circuit, and means for adjusting the position of the projection of said sleeve about the axis of said cam, substantially as described.

In testimony whereof I hereunto affix my signature in the presence of two witnesses.

SAMUEL EVERETT DOANE.

Witnesses:
J. B. HULL,
B. W. BROCKETT.